(12) United States Patent
Murray et al.

(10) Patent No.: US 12,278,870 B1
(45) Date of Patent: Apr. 15, 2025

(54) ADAPTIVELY SERVING HOLD CONTENT DURING AN AUTOMATED COMMUNICATION SESSION

(71) Applicant: INTERNATIONAL BUSINESS MACHINES CORPORATION, Armonk, NY (US)

(72) Inventors: Collin James Murray, Lynnfield, MA (US); David Amid, Modiin (IL); Anna Guri, Durham, NC (US); Jose Francisco Martinez-Rivera, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/477,499

(22) Filed: Sep. 28, 2023

(51) Int. Cl.
*H04L 67/14* (2022.01)
*H04L 41/16* (2022.01)

(52) U.S. Cl.
CPC ............. *H04L 67/14* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 6,978,001 B1* | 12/2005 | Shaffer | ............ | H04M 3/56 379/202.01 |
| 7,450,711 B2 | 11/2008 | Agapi | | |
| 9,294,619 B2 | 3/2016 | Marum | | |
| 10,049,688 B2 | 8/2018 | Keller | | |
| 10,855,844 B1* | 12/2020 | Smith | ............ | H04L 65/1069 |
| 11,564,266 B1* | 1/2023 | Kahn | ............ | H04W 76/10 |
| 2005/0008141 A1 | 1/2005 | Kortum | | |
| 2006/0041891 A1* | 2/2006 | Aaron | ............ | G09B 7/00 719/315 |
| 2007/0115845 A1* | 5/2007 | Hochwarth | ............ | H04L 67/142 370/252 |

(Continued)

FOREIGN PATENT DOCUMENTS

CA          3019997 A1 *  4/2020  ............. G06N 3/006

OTHER PUBLICATIONS

Disclosed Anonymously, "System and Method for Personalizing On-Hold Call Time by Leveraging Personal History Service to Dynamically Assemble and Deliver Personalized Content", IP.com (2019), IPCOM000259713D, 3 pgs.

*Primary Examiner* — Phyllis A Book
(74) *Attorney, Agent, or Firm* — Intelletek Law Group, PLLC; Gabriel Daniel, Esq.

(57) ABSTRACT

A computer product and methodology is contemplated for adaptively serving hold content during an automated communication session. This includes training a machine learning model with a set of training data that includes a feature of hold duration times during historical automated communication sessions. In response to encountering a computer transaction request during a new automated communication session, a hold time duration is predicted for executing the computer transaction request based on obtaining an inference from the machine learning model. Whether to serve hold content in response to the computer transaction request is determined, based on a comparison of the predicted hold time duration to a predetermined threshold time interval.

12 Claims, 4 Drawing Sheets

(56) References Cited

U.S. PATENT DOCUMENTS

| | | | |
|---|---|---|---|
| 2007/0299939 A1* | 12/2007 | Johnston | H04M 7/006 |
| | | | 709/219 |
| 2017/0164217 A1* | 6/2017 | Lazarescu | H04L 67/142 |
| 2019/0052751 A1 | 2/2019 | Gabbai | |
| 2019/0147430 A1* | 5/2019 | Chen | G06F 18/2155 |
| | | | 705/40 |
| 2020/0112526 A1* | 4/2020 | Moon | G06N 3/006 |
| 2020/0382520 A1* | 12/2020 | Hatfield | H04L 63/08 |
| 2021/0224765 A1* | 7/2021 | Siddique | G06F 16/95 |
| 2021/0250108 A1* | 8/2021 | Nahata | H04B 17/12 |
| 2022/0272191 A1 | 8/2022 | Xia | |
| 2023/0351435 A1* | 11/2023 | Wright | G06Q 30/0224 |
| 2023/0370546 A1* | 11/2023 | Reouveni | H04M 3/493 |
| 2024/0203420 A1* | 6/2024 | Hernandez | G10L 15/30 |

* cited by examiner

ADAPTIVELY SERVING HOLD CONTENT DURING AN AUTOMATED COMMUNICATION SESSION

BACKGROUND

Technical Field

The present disclosure generally relates to machine learning ("ML"), and more particularly but not by way of limitation, to computer devices and methods for adaptively serving hold content during an automated communication session.

Description of the Related Art

Pre-recorded audible content is often used during automated telephone communication sessions when a caller is placed on hold. This audible content can take various forms such as music clips, news clips, advertisement clips, and the like. Modern advancements in phone based voicebot technology provide advanced capabilities that can connect to other networked systems to send and/or receive information in responding to a caller's transaction request. When interacting with a phone based voicebot, a caller expects a pleasant and readily understandable audible experience when placed on hold, as well as when the hold event is ending. The duration of a hold event can vary depending on factors such as the type of caller transaction request being responded to, the current volume of activity, network bandwidth and latency, and the like.

SUMMARY

According to an embodiment of the present disclosure, a computer-implemented method is provided for adaptively serving hold content during an automated communication session. The method includes training a machine learning model with a set of training data that includes a feature of hold duration times during historical automated communication sessions. In response to encountering a computer transaction request during a new automated communication session, a hold time duration is predicted for executing the computer transaction request based on obtaining an inference from the machine learning model. Whether to serve hold content in response to the computer transaction request is determined, based on a comparison of the predicted hold time duration to a predetermined threshold time interval.

In one embodiment, which may be combined with the preceding embodiment, a computer program product is provided for adaptively serving hold content during an automated communication session. The computer program product includes a computer readable storage medium having program instructions embodied therewith. An execution of the program instructions by a processor causes a computing device to train a machine learning model with a set of training data that includes a feature of hold duration times during historical automated communication sessions. In response to encountering a computer transaction request during a new automated communication session, a hold time duration is predicted for executing the computer transaction request based on obtaining an inference from the machine learning model. Whether to serve hold content in response to the computer transaction request is determined, based on a comparison of the predicted hold time duration to a predetermined threshold time interval.

In one embodiment, a computer system is provided for adaptively serving hold content during an automated communication session. The computer system includes a processor, a computer-readable memory, a computer-readable tangible storage device, and program instructions stored on the computer-readable storage device for execution by a processor via the computer-readable memory. The computer system is configured to perform a method of training a machine learning model with a set of training data that includes a feature of hold duration times during historical automated communication sessions. In response to encountering a computer transaction request during a new automated communication session, the method further includes predicting a hold time duration for executing the computer transaction request based on obtaining an inference from the machine learning model. The method further includes determining whether to serve hold content in response to the computer transaction request, based on a comparison of the predicted hold time duration to a predetermined threshold time interval.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
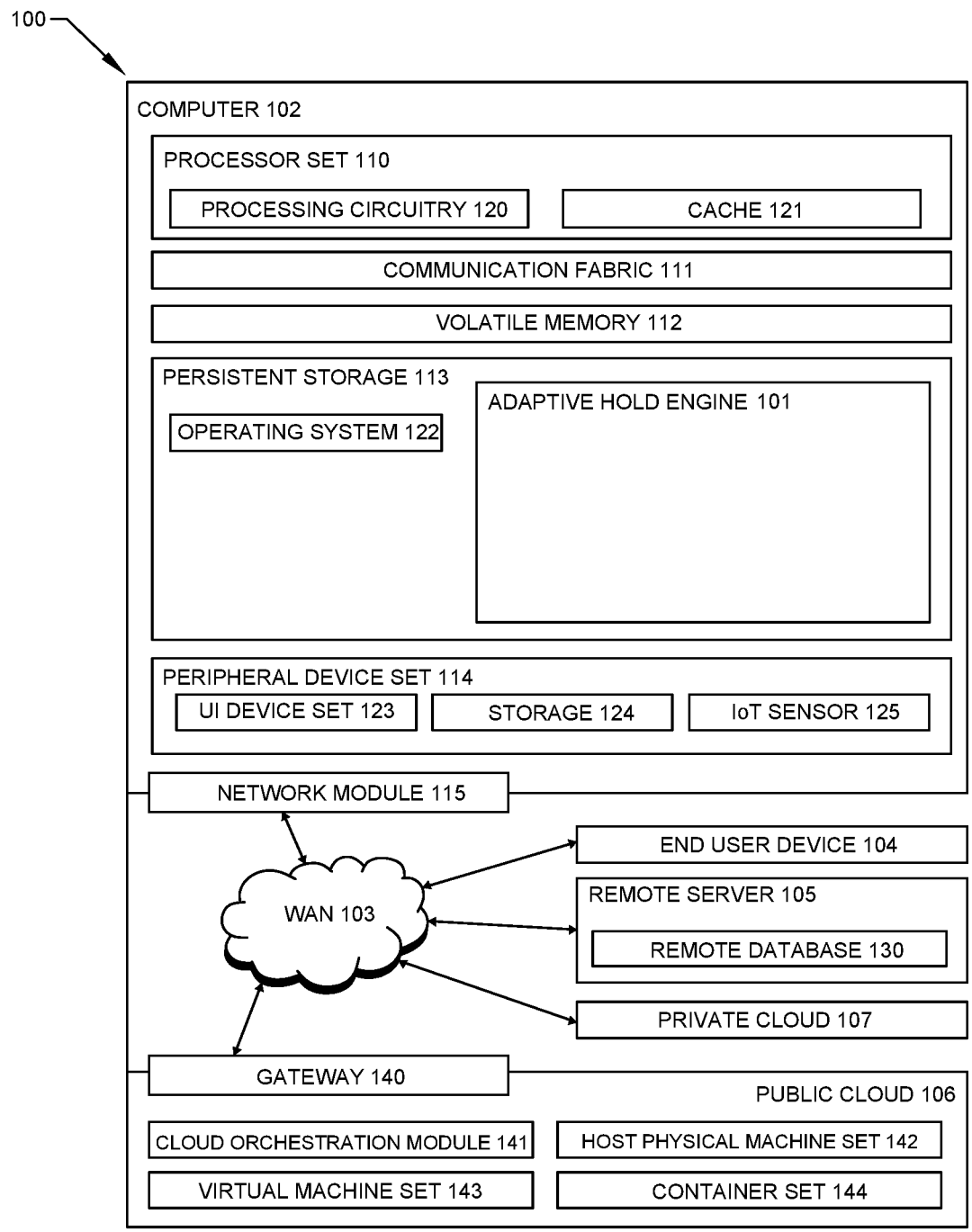
FIG. 1 is a functional block diagram of an operating environment for adaptively serving hold content during an automated communication session, consistent with illustrative embodiments.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

To better understand the features of the present disclosure, it may be helpful to discuss known architectures. To that end, the following detailed description illustrates various aspects of the present disclosure by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 includes an example of an environment for the execution of at least some of the computer code involved in performing the inventive methods, including an adaptive hold block 101. In addition to block 101, computing environment 100 includes, for example, computer 102, wide area network (WAN) 103, end user device (EUD) 104, remote server 105, public cloud 106, and private cloud 107. In this embodiment, computer 102 includes processor set 110 (including processing circuitry 120 and cache 121), communication fabric 111, volatile memory 112, persistent storage 113 (including operating system 122 and adaptive hold block 101, as identified above), peripheral device set 114 (including user interface (UI) device set 123, storage 124, and Internet of Things (IoT) sensor set 125), and network module 115. Remote server 105 includes remote database 130. Public cloud 106 includes gateway 140, cloud orchestration module 141, host physical machine set 142, virtual machine set 143, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in adaptive hold block 101 in persistent storage 113.

COMMUNICATION FABRIC 111 is the signal conduction path that allows the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 113 is any form of non-volatile storage for computers that is now known or to be developed in the future. The non-volatility of this storage means that the stored data is maintained regardless of whether power is being supplied to computer 102 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in adaptive hold block 101 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 102 to communicate with other computers through WAN 103. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 102 from an external computer or external storage device through a network adapter card or network interface included in network module 115.

WAN 103 is any wide area network (for example, the internet) capable of communicating computer data over non-local distances by any technology for communicating computer data, now known or to be developed in the future. In some embodiments, the WAN 103 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 104 is any computer system that is used and controlled by an end user (for example, a customer of an enterprise that operates computer 102), and may take any of the forms discussed above in connection with computer 102. EUD 104 typically receives helpful and useful data from the operations of computer 102. For example, in a hypothetical case where computer 102 is designed to provide a recommendation to an end user, this recommendation would typically be communicated from network module 115 of computer 102 through WAN 103 to EUD 104. In this way, EUD 104 can display, or otherwise present, the recommendation to an end user. In some embodiments, EUD 104 may be a client device, such as thin client, heavy client, mainframe computer, desktop computer and so on.

REMOTE SERVER 105 is any computer system that serves at least some data and/or functionality to computer 102. Remote server 105 may be controlled and used by the same entity that operates computer 102. Remote server 105 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 105.

PUBLIC CLOUD 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 106 is performed by the computer hardware and/or software of cloud orchestration module 141. The computing resources provided by public cloud 106 are typically implemented by virtual computing environments that run on various computers making up the computers of host physical machine set 142, which is the universe of physical computers in and/or available to public cloud 106. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 106 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 107 is similar to public cloud 106, except that the computing resources are only available for use by a single enterprise. While private cloud 107 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 106 and private cloud 107 are both part of a larger hybrid cloud.

Figure 2:
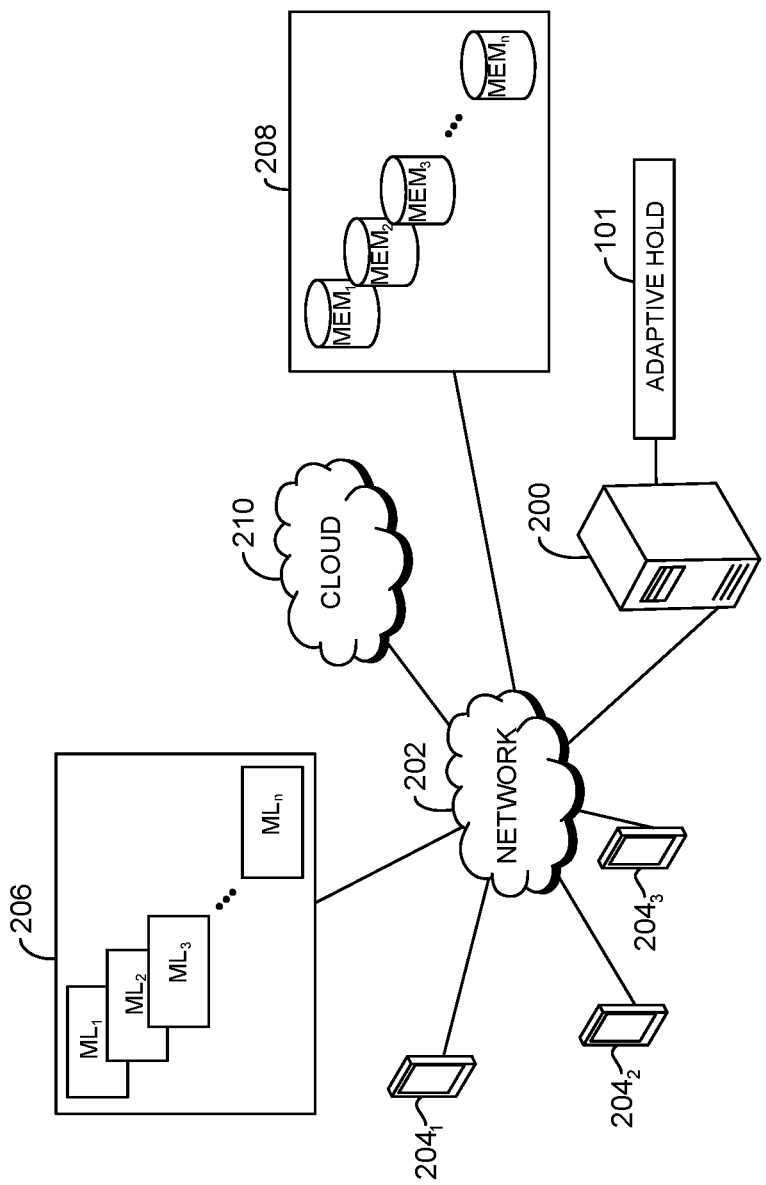
FIG. 2 conceptually depicts illustrative embodiments of the operating environment of FIG. 1 for adaptively serving hold content during an automated communication session, consistent with illustrative embodiments.

For example, FIG. 2 conceptually depicts the computer 102 of FIG. 1 in a centralized computer server 200, which is part of a distributed computing system architecture for adaptively serving hold content during an automated communication session in accordance with embodiments of this technology. The computer server 200 can communicate expansively, via a computer network 202, such as with remote user devices 204, with computer machine learning resources 206, and with computer memory 208.

The computer network 202 can be, but is not limited to, a local area network ("LAN"), a virtual private network ("VPN"), a cellular network, the Internet, combinations thereof, and the like. For example, the computer network 202 can include a mobile network that is communicatively coupled to a private network, sometimes referred to as an intranet that provides various ancillary services, such as communication with various application stores, libraries, and the Internet.

The user devices 204 can send and receive information throughout the computer network 202. They can include stationary computing devices such as desktop computers and enterprise computing systems, as well as portable computing devices such as laptop computers, portable handsets, a mobile phone computing device, a vehicle communications system, a smart appliance such as a smart television or projector, tablet computers, personal digital assistants ("PDAs"), a wearable computing device such as a smart watch, glasses, virtual or augmented reality computing devices, and the like.

In these embodiments, the distributed computing resources available to the server 200 include any number of computer machine learning resources 206, and computer memory 208 for data storage. "Machine learning" ("ML") broadly describes a function of an electronic system that learns from data. A machine learning system, engine, or module can include a trainable machine learning algorithm stored in computer memory that can be trained, such as in an external cloud environment, to learn functional relationships between inputs and outputs that are currently unknown.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

Accordingly, the computer 102 (FIG. 1) has a specialized processing unit, such as the adaptive hold block 101 and the like, for carrying out ML-based computations. More particularly, without limitation, the specialized processing unit automatically and consistently deploys ML in adaptively serving hold content during an automated communication session. The computer system is thereby specifically configured to provide technical improvements to data systems, machine learning systems, artificial intelligence systems, and systems of data analysis systems such as but not limited to data classification systems, data regression systems, data clustering systems, and the like. The ML output can further provide one or more inferences, provide one or more predictions, and/or determine one or more relationships among the data. For example, ML serving as described herein may model one or more inferences and/or predictions and/or may determine one or more relationships amongst the variables analyzed in the data. An ML model is produced for predicting outputs, e.g., probabilities, at factual (historical) action values from a training dataset of historical data. The ML model that is optimized is, however, far more accurate and efficient than traditional hold time predicting. Thus, the ML model optimization that is produced helps with downstream decision making, even with such downstream decision making that is automated.

The ML resources can employ any suitable ML based techniques, statistical-based techniques and/or probabilistic-based techniques. For example, the ML resources can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, and the like. For example, the ML resources can perform a set of clustering ML computations, a set of logistic regression ML computations, a set of decision tree ML computations, a set of random forest ML computations, a set of regression tree ML computations, a set of least square ML computations, a set of instance-based ML computations, a set of support vector regression ML computations, a set of k-means ML computations, a set of spectral clustering ML computations, Gaussian mixture model ML computations, a set of regularization ML computations, a set of rule ML computations, a set of Bayesian ML computations, a set of deep Boltzmann computations, a set of deep belief network computations, a set of convolution neural network computations, a set of stacked auto-encoder computations and/or a set of different ML computations.

Accordingly, the distributed computing system generally facilitates optimizing ML serving predictions in accordance with one or more embodiments illustratively described herein. For example, the optimizations can be related to a ML system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit associated with a ML process by improving processing performance of the computer processing unit, reducing computing bottlenecks of the computer processing unit, improving processing efficiency of the computer processing unit, and/or reducing an amount of time for the computer processing unit to perform the ML process.

Figure 3:
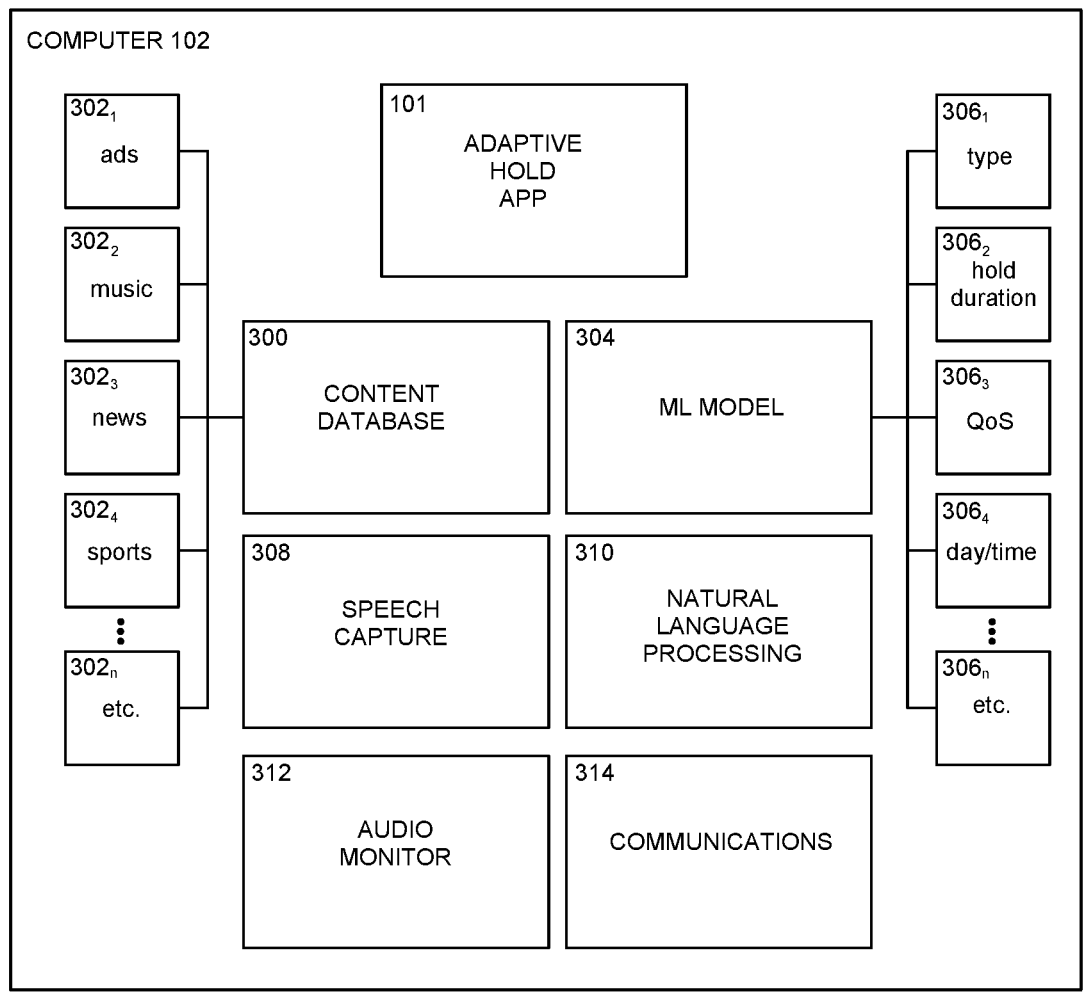
FIG. 3 is another functional block diagram of the operating environment of FIG. 1 for adaptively serving hold content during an automated communication session, consistent with illustrative embodiments.

FIG. 3 further illustrates example embodiments of the operating environment of FIGS. 1 and 2. For the sake of clarity, the components of FIG. 3 can be physically located anywhere, in part or in whole, that is accessible via the computer network 202, including the computer server 200, the remote computer machine learning resources 206, the remote computer memory 208, cloud-based resources 210, and the like. For example, one or more components of FIG. 3 can be implemented on one or more computing devices and/or systems other than the computer 102, that are in network communication with the computer 102. Each of the other computing devices and/or systems can have computer memories for data storage and software/firmware applications, processors for accessing data and executing applications, and other components that facilitate network communications. In other words, the adaptive hold block 101 can be performed by one or more distributed computing devices across multiple remote locations. Thus, the adaptive hold block 101 can be implemented as, for example, computer programs running on one or more computers running in one or more locations that are coupled to each other through a network.

In illustrative implementations, the computer 102 can automatically engage in a user's communication session. For example, the computer 102 can monitor the contents of an audio stream during the user's communication session, and/or monitor the contents of user-provided inputs during the user's communication session. For example, in response to certain content the computer 102 can execute certain predefined routines. In other examples, the computer 102 can utilize speech recognition resources to convert the user's spoken words into understandable text language and respond to the user text accordingly in text language. In some embodiments, as discussed below, the computer 102 can thereby identify when a computer transaction has been requested during a user communication, and in response execute the adaptive hold block 101 to efficiently and consistently control if, and how long, the user will be served hold content during execution of the requested transaction.

In these illustrative embodiments, the adaptive hold block 101 can access a content database block 300. This enables selectively serving any of a number of prerecorded audio content clips 302 during a user communication session. For example, audio content in the forms of promotional advertisement clips 3021, music clips 3022, news clips 3023, sports clips 3024 and the like can be individually selected and served during a communication session. The audio content clips 302 can be organized into different types, interests, categories, and so on. Appropriate audio content clips 302 can be selected for presentation to users when they are put on hold, based on a user's demographics and interests. Audio content clips 302 can be provided of varying durations, so that the adaptive hold block 101 can select content that best matches a predicted duration of a hold event during a communication session.

The adaptive hold block 101 can also employ a ML model block 304 to gain access to one or more ML models that are trained in terms of pertinent feature domains. For example, the ML model(s) can be trained in terms of historical transaction request features such as the type of transaction 3061, the hold time for executing the transaction 3062, the tail latency of cloud-provisioned services 3063, the day of week and/or time of day 3064, and the like. The adaptive hold block 101 can access the ML model block 304 such as to obtain inference services from historical data, and/or to further train the ML model(s) with new data obtained during a communication session.

A speech capture block 308 can be configured to capture the user's speech such as via a microphone. It can convert the captured audio content such as into text language ("STT"), and/or it can convert text language into audio content ("TTS"). A natural language processing block 310 can receive free-form language input and generate annotated output. For instance, the block 310 can include a speech tagger configured to annotate terms with grammatical information. The block 310 can also or alternatively include an entity tagger configured to annotate the terms with entity references, such as references to people, places, organizations, and the like. The block 310 can also or alternatively include a dependency parser configured to annotate terms with syntactic relationships. The block 310 can also or alternatively include a coreference resolver configured for contextual groupings. These components of the block 310 can cross-rely on the generated annotations. For example, the entity tagger can rely on annotations by the coreference resolver, and so on.

An audio stream monitor 312 can be configured to monitor the incoming and/or outgoing portions of an audio stream during a user's communication session. Furthermore, the adaptive hold block 101 can leverage a communications block 314 that interfaces with a call holding management service enabling efficient and consistent network communications. For example, the communications block 314 can be configured to implement and supervise wired communication, such as Ethernet communication and/or telephone landline communication, and wireless communication, such as WiFi communication, Bluetooth communication, cellular voice and/or data communication, Near-Field Communication (NFC), and the like.

Figure 4:
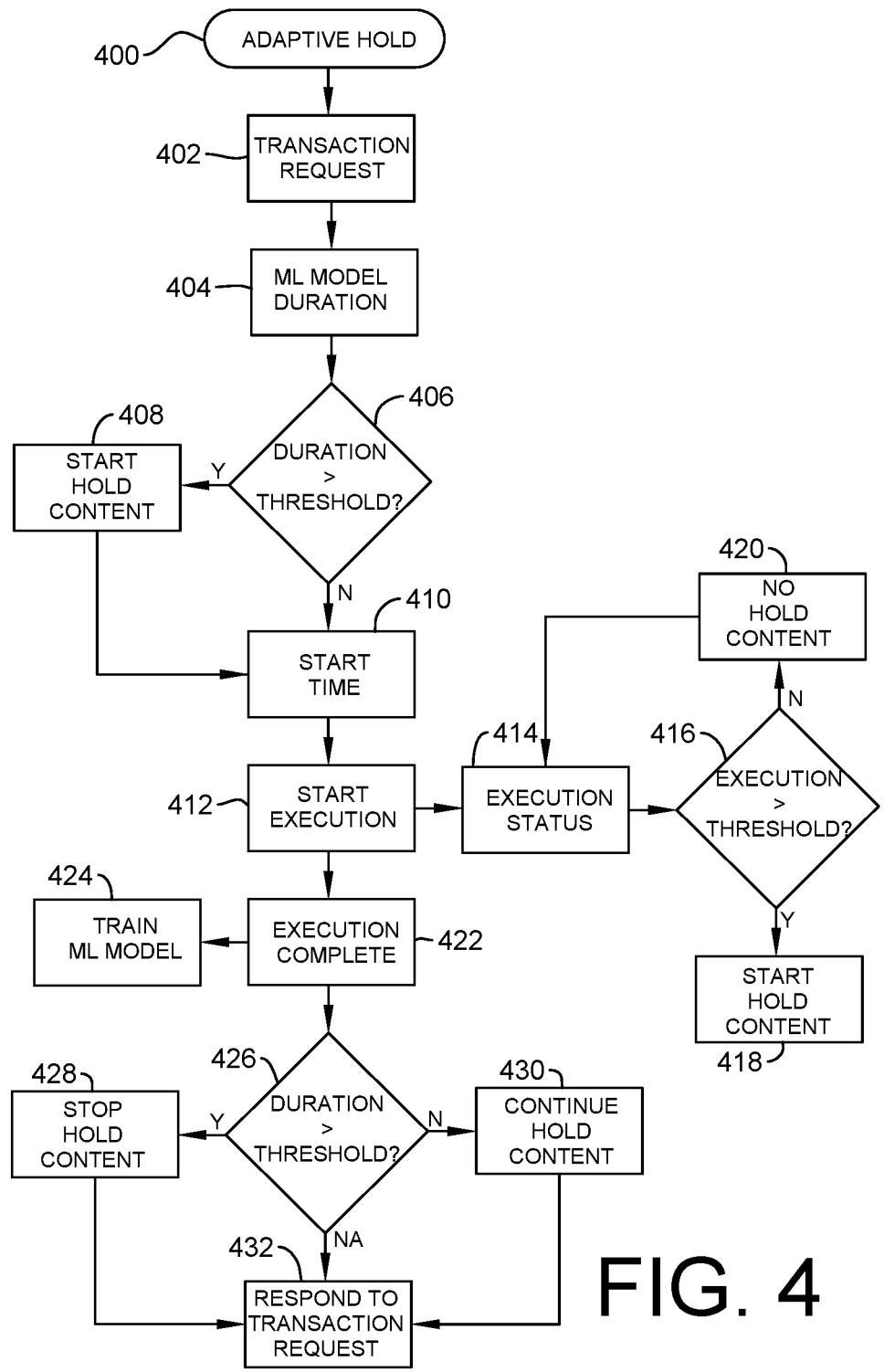
FIG. 4 is a flowchart depicting steps in a process performed by the adaptive hold block in FIG. 1, consistent with illustrative embodiments.

Recall from the prior discussion of FIG. 1 that in illustrative embodiments the adaptive hold block 101 can be a computer program product ("CPP"). The CPP can have a computer readable storage medium (e.g., persistent storage 113) and program instructions embodied therewith, and a processor set 110 configured to execute the program instructions. FIG. 4 is a flowchart depicting steps in a process 400 performed by the adaptive hold block 101 upon executing its program instructions, consistent with illustrative embodiments. The process 400 can begin in block 402 when a computer transaction request is encountered during a user communication session. In response, block 404 employs a ML model resource that has been trained with a set of training data featuring, in part, the historical account of hold durations that occurred while executing computer transaction requests during previous automated communication sessions. The trained ML model domain can also include other pertinent training features such as user characteristics, transaction type, network and/or cloud latency, day of week and/or time of day, network and/or system workload, and the like.

Thus, in response to encountering a computer transaction request during a new automated communication session, block 404 predicts a hold duration, based on obtaining an inference from the ML model. By employing ML model inferencing, each prediction can be uniquely based on a probabilistic distribution corresponding to the individually encountered computer transaction request. This advantageously enables block 404 to tune a predicted hold duration derived by the ML model inference to optimize the use of the pre-recorded audio content clips 302. For instance, block 404 can set the predicted hold duration to match the runtime of a preferred audio content clip 302 so that the user will hear that content in its entirety before the hold ends. The ML model inferencing also enables block 404 to most efficiently set the predicted hold duration to maximize the likelihood it will be sufficient for its intended purpose of providing sufficient time to execute the computer transaction request.

In block 406, a determination can be made as to whether or not to serve hold content in response to the computer transaction request, based on comparing the predicted hold duration derived in block 404 to a predetermined threshold duration. The predetermined threshold duration can be selected to efficiently and consistently distinguish between those computer transaction requests that justify serving hold content from those that don't, for the sake of an acceptable user experience during the automated communication session. Modern advancements in automated communications, such as in natural language understanding ("NLU") technology, enable advanced processing capabilities such as connecting to other computer systems for sending and receiving information as part of executing a computer transaction request. These modern automations are distinguishable from the more simple and routine matters that can be addressed by state-of-the-art interactive voice recognition ("IVR") technology, which is limited in scope to only those computer transaction requests that can be handled with canned routines and responses.

When interacting with a phone bot, a user expects some type of audible cue, such as hold music, to inform him that an operation is going to take more time than what an immediate, real-time response would take. The actual required hold duration for executing any given computer transaction request varies depending on a number of factors such as the type of computer transaction request and the current capability of the computer system(s) executing the computer transaction request. That capability further breaks down into several contributing factors such as the computer system's current workload volume, computer network bandwidth and latency, and the like. Due to the complex interactions of these factors, just automatically serving hold content when invoking a hold can often result in cases where audible sounds can start, be interrupted, and abruptly stop within a very short period of time. Receiving such unintelligible and unpleasant verbal miscues can provide an uncertain and unpleasant user experience, leaving the user wondering what is happening. All too often this results in the user getting frustrated and disconnecting.

Modern advancements in automated communications processing is exemplified by IBMR's Watson AI technology that has a market leading chatbot and out of the box voice solution that includes advanced capabilities such as integrating/extending to external services, such as third party and in-house and/or proprietary services, to provide greater functionality for its customers and end users. As customers expand their Watson Assistant chatbots to include the built-in phone and extensions capabilities, response times for bot interactions will vary based on the systems they can connect to, along with the variable factors associated with those connections such as system load and the like. While some responses will be returned within an acceptable conversational duration of time, some operations will require more time. In the former case, it can be generally preferable to not serve audible hold content. In the latter case, however, it can be generally preferable to service audible hold content. The predetermined threshold duration used in the comparison by block 406 can effectively function as a first pass filter for distinguishing these two cases. The predetermined threshold duration can be dynamically determined for each computer transaction request based on the prevailing system variables such as the type of computer transaction request and the computer system's current capability of executing the computer transaction request.

In these illustrative embodiments, if block 406 determines that the predicted hold duration of block 404 is greater than the predetermined threshold duration, then control passes to block 408 which starts serving a selected hold content. If, on the other hand, block 406 determines that the predicted hold duration of block 404 is not greater than the predetermined threshold duration, or if for any reason block 404 is unable to reliably predict a hold duration, then hold content is not served at this stage of the process 400. In any event, control then passes to block 410 which starts a timer, and block 412 which starts executing the computer transaction request when the timer starts, or at the start time.

Block 414 can perform a status check during execution of the computer transaction request. Block 416 can compare an elapsed execution time, such as from the start time in block 410 to the status check time in block 414, to a predetermined threshold execution interval. The threshold execution interval can be derived along similar considerations as the threshold duration of block 404, such as by aiming to reliably predict how long it will take to execute the transaction request. It can be factored, even weighted according to various different factors, to probabilistically determine whether or not the actual execution of the computer transaction request is going to take longer than the predicted hold duration in block 404. Like the predetermined threshold duration in block 404, the threshold execution interval in block 416 can be dynamically determined for each transaction request based on the prevailing system variables such as the type of transaction request and the computer system's current capability of executing the computer transaction request. The predetermined threshold execution interval used in the comparison by block 416 can effectively function as a second pass filter for distinguishing between the cases when hold content should and should not be served. That is, for example in these illustrative embodiments, if block 416 determines that the elapsed execution time is greater than the predetermined threshold execution interval, then control passes to block 418 which starts serving hold content. Otherwise, no hold content is served at this stage of the process 400, and block 420 continuously checks the status of the execution of the computer transaction request until it is completed.

Block 422 serves to monitor when the execution of the transaction request is complete, and in block 424 the ML model can be trained with the current set of domain feature values such as in block 404. Control then passes to block 426 which compares the play duration of any hold content, whether the hold content started in block 408 or in block 418, to a predetermined threshold play duration. This comparison effectively functions as a third pass filter that ensures all content plays for at least a minimum time interval in order to avoid the unpleasant user experience that can be associated with starting and stopping hold content too quickly, similar to the rationale for the comparison in block 406. And like the threshold duration in block 404 and the threshold execution interval in block 416, the threshold play duration can be dynamically determined for each transaction request based on the prevailing system variables such as the type of computer transaction request and the computer system's current capability of executing the transaction request.

If no hold content was started in either block 408 or in block 418, then block 426 is not applicable so control passes directly to block 432 which uses the results of the completed execution to respond to the computer transaction request ("NA"). If, however, the comparison in block 426 determines that the play duration of hold content, whether started in block 408 or in block 418, is greater than the threshold play duration, then control passes to block 428 which can stop serving the hold content in block 428, and then use the completed execution in block 432 to respond to the computer transaction request. If, contrarily, the comparison in block 426 determines that the play duration of hold content, whether started in block 408 or in block 418, is less than the threshold play duration, then control can pass to block 430 which can continue serving the hold content for a desired time interval. In some embodiments, block 430 can elect to continue serving the hold content for so long as the threshold play duration. In alternative embodiments, block 430 can elect to continue serving the hold content until it is completely played. In any event, block 430 can also elect to smooth the remaining hold content to give the user an audible cue that the hold is nearing completion. For purposes of this description and the meanings of the appended claims, the term "smooth" generally means to alter the audible presentation of the served content to the user for purposes of providing a distinguishing transition near the end of the served content's play duration. For example, without limitation, this can be done by reducing the volume of the served hold content, and/or by annotating the served hold content with a message, and the like. Control can then pass to block 432 which uses the completed execution to respond to the transaction request.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

It is to be appreciated that the computer system (e.g., the specialized computer 102, the adaptive hold block 101, and/or the processing resources) performs acts in adaptively serving hold content that cannot be performed by a human (e.g., is greater than the capability of a single human mind). For example, an amount of data processed, a speed of processing of data and/or data types of the data processed over a certain period of time can be greater, faster and different than an amount, speed and data type that can be processed by a single human mind over the same period of time. The computer system can also be fully operational towards performing one or more other functions while also performing the above-referenced serving adaptive hold content. Moreover, ML output generated by computer system can include information that is impossible to obtain manually by a user. For example, an amount of information included in the ML output and/or a variety of information included in the ML output can be more complex than information obtained manually by a user.

Moreover, because at least adaptive hold content serving is established from a combination of electrical and mechanical components and circuitry, a human is unable to replicate or perform processing performed by the computer system (e.g., specialized computer 102, the adaptive hold block 101, resources) disclosed herein. For example, a human is unable to communicate data and/or process data associated with the adaptive hold block 101 for a given downstream task. Furthermore, a human is unable to optimize ML model serving of adaptive hold content.

Additionally, the specialized computer 102 significantly improves the operating efficiencies of the computer system by deriving constrained probability models in response to a downstream task. Transmitting custom-tailored probability functions as disclosed herein intentionally and significantly eliminates the need to transmit large volumes of historical data. This frees up computer system processing overhead and storage capacities to attend to more important processes, generally reducing the overall computational overhead of ML.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:
 training a machine learning model with a set of training data that features hold durations during historical automated communication sessions;
 receiving a computer transaction request over a communication network, during a new automated communication session between a user and a chatbot;
 in response to receiving the computer transaction request during the new automated communication session, obtaining a predicted hold duration for executing the computer transaction request based on an inference from the machine learning model;
 determining whether to serve a hold content in response to the computer transaction request, based on a comparison of the predicted hold duration to a predetermined threshold duration;
 serving the hold content if the predicted hold duration is greater than the predetermined threshold duration;
 beginning to execute the computer transaction request at a start time;
 determining an elapsed execution time since the start time; and
 serving the hold content if the elapsed execution time is greater than a predetermined threshold execution interval.

2. The computer-implemented method of claim 1, further comprising stop serving the hold content if a play duration of served hold content is greater than a predetermined threshold play duration.

3. The computer-implemented method of claim 2, further comprising continue serving the hold content if the play duration of served hold content is less than the predetermined threshold play duration.

4. The computer-implemented method of claim 3, further comprising smoothing the served hold content after executing the computer transaction request is complete.

5. The computer-implemented method of claim 4, wherein the smoothing comprises reducing an audible volume of the served hold content.

6. The computer-implemented method of claim 1, further comprising, after executing the computer transaction request is complete, training the machine learning model with domain feature values from the new automated communication session.

7. A computer program product for adaptively serving hold content during an automated telephone communication session, the computer program product comprising a computer readable storage medium having program instructions embodied therewith, wherein an execution of the program instructions by a processor causes a computing device to:
 train a machine learning model with a set of training data that features hold durations during historical automated communication sessions;
 in response to encountering a computer transaction request during a new automated communication session, obtain a predicted hold duration for executing the computer transaction request based on an inference from the machine learning model;
 determine whether to serve hold content in response to the computer transaction request, based on a comparison of the predicted hold duration to a predetermined threshold duration;
 serve the hold content if the predicted hold duration is greater than the predetermined threshold duration;
 begin executing the computer transaction request at a start time;
 determine an elapsed execution time since the start time; and
 serve the hold content if the elapsed execution time is greater than a predetermined threshold execution interval.

8. The computer program product of claim 7, wherein the execution of the program instructions by the processor further causes the computing device to stop serving the hold content if a play duration of served hold content is greater than a predetermined threshold play duration.

9. The computer program product of claim 8, wherein the execution of the program instructions by the processor further causes the computing device to continue serving the hold content if the play duration of served hold content is less than the predetermined threshold play duration.

10. The computer program product of claim 9, wherein the execution of the program instructions by the processor further causes the computing device to smooth the served hold content after execution of the computer transaction request is complete.

11. The computer program product of claim 7, wherein the execution of the program instructions by the processor further causes the computing device to train the machine learning model with domain feature values from the new automated communication session after execution of the computer transaction request is complete.

12. A computer system for adaptively serving hold content during an automated communication session, the computer system comprising:
 a processor, a computer-readable memory, a computer-readable storage device, and program instructions stored on the computer-readable storage device for execution by a processor via the computer-readable memory, wherein the computer system is configured to perform a method, comprising:
 train a machine learning model with a set of training data that features hold durations during historical automated communication sessions;
 receive a computer transaction request over a communication network, during a new automated communication session between a user and a chatbot;
 in response to encountering a computer transaction request during a new automated communication session, obtain a predicted hold duration for executing the computer transaction request based on an inference from the machine learning model;
 determine whether to serve hold content in response to the computer transaction request, based on a comparison of the predicted hold duration to a predetermined threshold duration;
 serve the hold content if the predicted hold duration is greater than the predetermined threshold duration;
 begin to execute the computer transaction request at a start time;
 determine an elapsed execution time since the start time; and
 serve the hold content if the elapsed execution time is greater than a predetermined threshold execution interval.

* * * * *